(12) United States Patent
Duggan

(10) Patent No.: US 12,377,952 B2
(45) Date of Patent: Aug. 5, 2025

(54) REMOVABLE TINTED WINDOW PANELS FOR AIRCRAFT COCKPIT WINDOWS

(71) Applicant: Jet Shades, LLC, Fernandina Beach, FL (US)

(72) Inventor: Kevin Duggan, Fernandina Beach, FL (US)

(73) Assignee: Jet Shades, LLC, Fernandina Beach, FL (US)

( * ) Notice: Subject to any disclaimer, the term of this patent is extended or adjusted under 35 U.S.C. 154(b) by 0 days.

(21) Appl. No.: 18/634,336

(22) Filed: Apr. 12, 2024

(65) Prior Publication Data

US 2024/0343379 A1   Oct. 17, 2024

Related U.S. Application Data

(60) Provisional application No. 63/495,850, filed on Apr. 13, 2023.

(51) Int. Cl.
*B64C 1/14* (2006.01)
*B60J 3/02* (2006.01)

(52) U.S. Cl.
CPC .......... *B64C 1/1492* (2013.01); *B60J 3/0286* (2013.01)

(58) Field of Classification Search
CPC .............................. B64C 1/1492; B60J 3/0286
USPC ....................................................... 296/97.7
See application file for complete search history.

(56) References Cited

U.S. PATENT DOCUMENTS

| | | | |
|---|---|---|---|
| 1,963,393 A | 6/1934 | Woodall | |
| 2,730,777 A | 1/1956 | Koriagin | |
| 3,698,761 A | 10/1972 | Niwa | |
| 3,880,496 A | 4/1975 | Davidyan | |
| 4,004,388 A | 1/1977 | Stefanik | |
| 4,261,649 A | 4/1981 | Richard | |
| 4,453,585 A | 6/1984 | Ruggeberg | |

(Continued)

FOREIGN PATENT DOCUMENTS

| | | |
|---|---|---|
| EP | 0992379 A2 | 4/2000 |
| GB | 2400882 A | 10/2004 |
| WO | 2015093888 A1 | 6/2015 |

OTHER PUBLICATIONS

Video entitled "New Jet Shades Cruising Shades promo", available at <https://www.youtube.com/watch?v=ru8ED5B6GVs> (Jet Shades) Apr. 8, 2023 (Apr. 8, 2023), entire document, especially at 0:24 to 1:01; Caption below the Video.

(Continued)

*Primary Examiner* — Christopher D Hutchens
(74) *Attorney, Agent, or Firm* — Hinckley Allen & Snyder; Stephen Holmes

(57) ABSTRACT

A removable tinted window panel system for an aircraft cockpit may include unique tinted panels and panel brackets which are easily installed and removed allowing full compliance with FAA regulations. The tinted panels, when installed, block 99.9% of UV radiation, reduce glare by up to 70%, reduce heat from solar energy up to 47% and thereby improve overall cockpit environment and pilot comfort. The panels allow the pilot to selectively block the sun when needed to remove glare and to remove the discomfort of being exposed to direct sunlight coming from the side windows. The panels reduce pilot fatigue, reduce eye strain and increase pilot performance and comfort and most of all improve flying safety.

7 Claims, 7 Drawing Sheets

(56) References Cited

U.S. PATENT DOCUMENTS

| | | | |
|---|---|---|---|
| 4,607,875 A | 8/1986 | McGirr | |
| 4,702,517 A | 10/1987 | Maeda | |
| 4,746,162 A | 5/1988 | Maness | |
| 4,862,944 A | 9/1989 | Hendershot | |
| 4,877,658 A | 10/1989 | Calhoon | |
| 5,588,476 A | 12/1996 | Trethewey | |
| 5,737,885 A | 4/1998 | Stoyke | |
| 6,007,899 A | 12/1999 | Yoshizawa | |
| 6,120,085 A | 9/2000 | Wooldridge | |
| 6,663,158 B1 | 12/2003 | Showalter | |
| 7,090,283 B2 | 8/2006 | Farley | |
| 9,322,209 B1 | 4/2016 | Schwind | |
| 9,512,666 B2 | 12/2016 | Reyher | |
| 9,580,954 B2 | 2/2017 | Pardue | |
| 11,524,556 B2 | 12/2022 | Brentzel | |
| 2002/0184841 A1 | 12/2002 | Diamond | |
| 2003/0084625 A1 | 5/2003 | Iguchi | |
| 2004/0058104 A1 | 3/2004 | Farley | |
| 2007/0095984 A1* | 5/2007 | Wood | B64C 1/1492 244/129.3 |
| 2008/0271857 A1 | 11/2008 | Swalding | |
| 2012/0228428 A1 | 9/2012 | Deganis | |
| 2012/0292941 A1* | 11/2012 | Bills | B60J 1/2011 296/97.2 |
| 2014/0144090 A1 | 5/2014 | Rebman | |
| 2014/0174006 A1 | 6/2014 | Pardue | |
| 2015/0024218 A1 | 1/2015 | Koga | |
| 2016/0348418 A1 | 12/2016 | Wexler | |
| 2017/0174310 A1 | 6/2017 | Klettke | |
| 2019/0161155 A1* | 5/2019 | Duggan | B64C 1/1492 |
| 2020/0339240 A1 | 10/2020 | Duggan | |
| 2021/0178866 A1* | 6/2021 | Biernacki | B60J 3/0286 |
| 2023/0166827 A1* | 6/2023 | Evans | B64C 1/1492 244/129.3 |

OTHER PUBLICATIONS

Sanlorenzo M, Vujic I, Posch C, Cleaver JE, Quaglino P, Ortiz-Urda S., The Risk of Melanoma in Pilots and Cabin Crew: UV Measurements in Flying Airplanes. JAMA Dermatol. 2015;151(4):450-452.

* cited by examiner

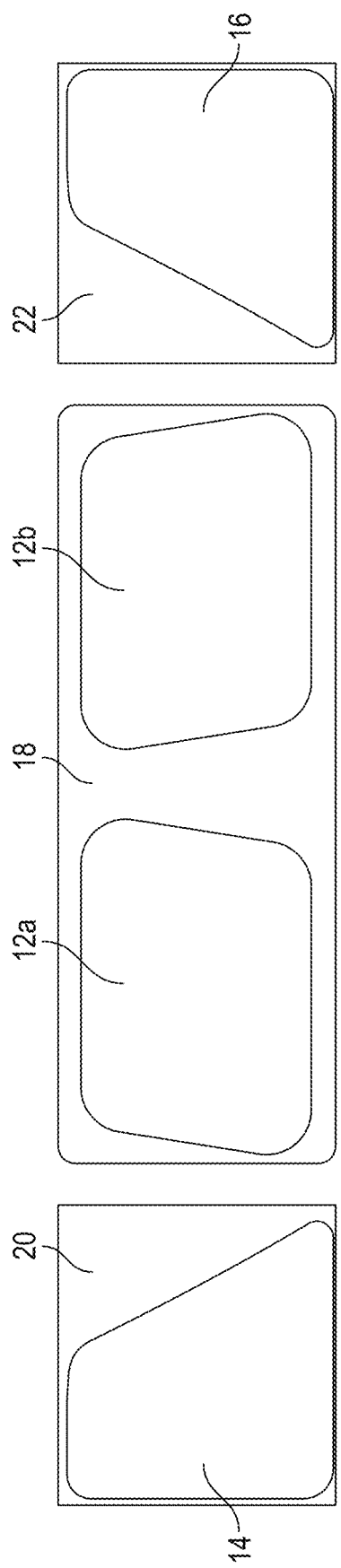
FIG. 1
FIG. 2
FIG. 3

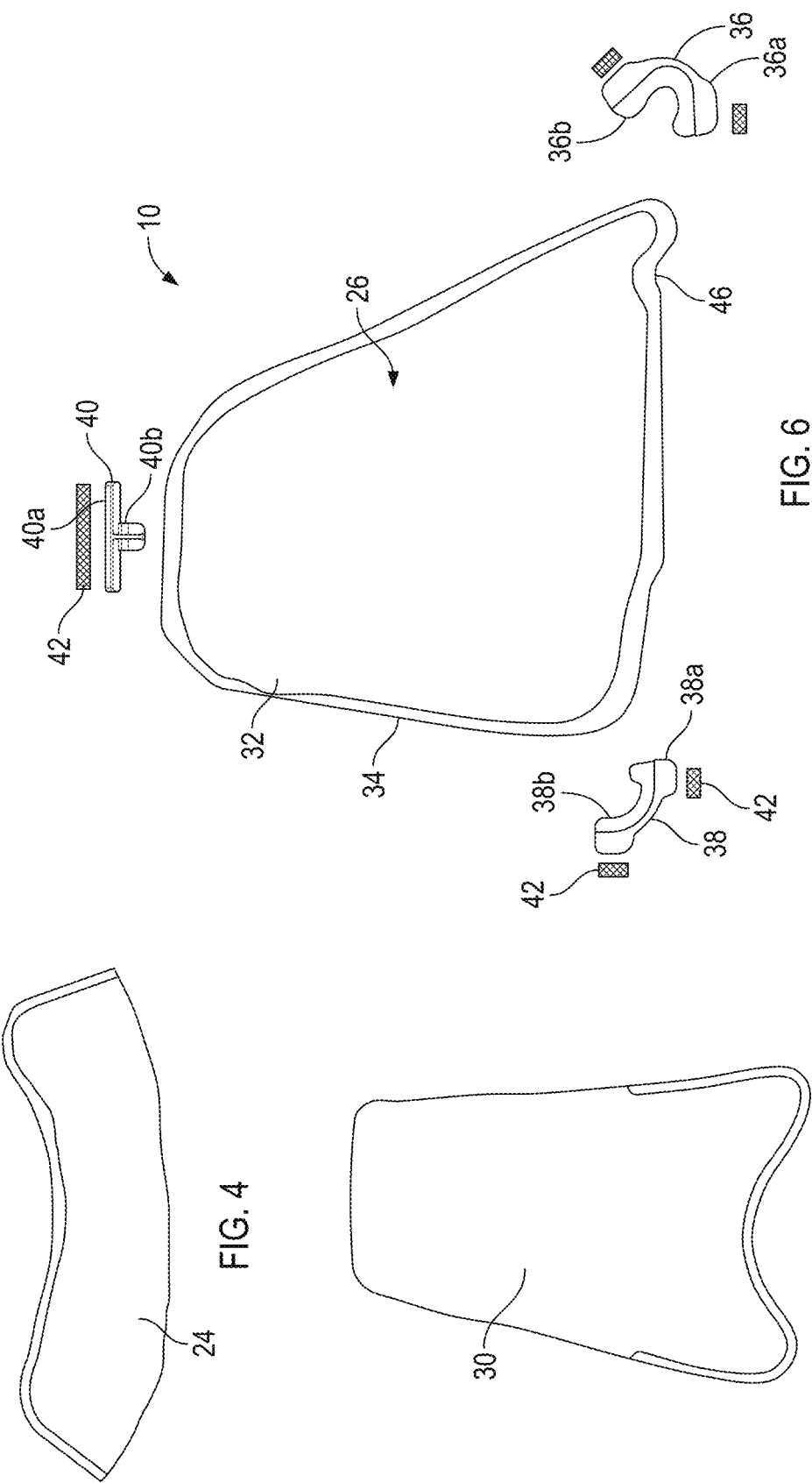

REMOVABLE TINTED WINDOW PANELS FOR AIRCRAFT COCKPIT WINDOWS

CROSS-REFERENCE TO RELATED APPLICATIONS

This application claims the benefit of U.S. Provisional Patent Application Ser. No. 63/495,850, filed Apr. 13, 2023, the entire contents of which is incorporated herein by reference.

BACKGROUND OF THE DISCLOSURE (1) Field of the Invention: The instant disclosure relates to aircraft cockpit windows and more particularly to removable tinted window panels which reduce glare, UV exposure and heat inside the cockpit.

(2) Description of Related Art: There are currently no viable options available for reducing glare and UV exposure within an aircraft cockpit. Most aircraft cockpit windows are clear glass to provide for optimum visibility. However, the clear aircraft cockpit windows create unique glare, UV and heat issues for the pilot while on the ground and more particularly while flying. While on the ground, many aircraft sit exposed to the sun for extended periods of time either during storage or simply while awaiting takeoff. Glare, particularly during flight, obscures the aircraft navigation display panels, which are now mostly electronic LCD displays. Heat quickly builds up in small cockpit areas from exposure to direct sun. While in the air, the aircraft is exposed to higher UV indexes and experiences even greater glare than while on the ground. A 2015 study published in JAMA Dermatology found that pilots flying for 56.6 minutes at 30,000 feet receive the same amount of UV-A carcinogenic effective radiation as that from a 20-minute tanning bed session and that these levels could be significantly higher when flying over thick cloud layers and snow fields, which could reflect up to 85% of UV radiation. Most importantly, the study concluded that airplane windshields: (a) do not completely block UV-A radiation; (b) are not enough to protect pilots; (c) that UV-A transmission inside airplanes can play a role in pilots' increased risk of melanoma; and (d) that better UV protection on aircraft windshields is necessary to offer cabin crew a hazard-free work environment. [Sanlorenzo M, Vujic I, Posch C, Cleaver JE, Quaglino P, Ortiz-Urda S., The Risk of Melanoma in Pilots and Cabin Crew: UV Measurements in Flying Airplanes. JAMA Dermatol. 2015;151(4):450-452.] Despite this 10 year old study, there are still no viable options for reducing glare and UV exposure within aircraft cockpits.

One critical reason for this void in product offerings is that the FAA strictly regulates any permanent or temporary modifications to any aircraft such as directly tinting the windows or installing any type of shade. Generally, speaking 14 CFR Parts, 23, 27, 31, 33 and 35 include comprehensive regulations which define airworthiness of all types of aircraft, components and parts installed within aircraft. The rule governing replacement parts and modifications for installation on a type-certificated airplane is 14 CFR part 21.303. This rule says that all parts for installation on certified products such as an airplane or engine must be produced by a company that holds a parts manufacturer approval (PMA). When a product alters an airplane enough for the change to be considered a major change in the type design, but not enough to require a new type certificate, the change is accomplished under the provisions of a supplemental type certificate, or STC. Most popular modifications fall under the STC category. Vortex generators, engine and propeller upgrades, STOL (short takeoff and landing) kits, strobe lighting kits, engine analyzers, and wheel and brake upgrades are examples of typical modifications that are approved by the STC process. Window modifications may also fall under the requirements for an STO.

There are several FAA regulations which may specifically apply to cockpit window modifications. 14 CFR 23.773(a)(1)—Pilot Compartment View—specifies that each pilot compartment must be—"(1) Arranged with sufficiently extensive, clear and undistorted view to enable the pilot to safely taxi, takeoff, approach, land, and perform any maneuvers within the operating limitations of the airplane." This regulation requires that any shading device placed within the cockpit window area must be easily removable so that the pilot is able to perform any required maneuvers as if the shades were not installed. Any shade must also be easily removable for night operation. 14 CFR 23.807(b) Emergency exits—Type and operation—states—"emergency exits must be movable windows, panels, canopies, or external doors, openable from both inside and outside the airplane, that provide a clear and unobstructed opening large enough to admit a 19-by-26-inch ellipse." In additional to the rearward emergency exits, pilot cockpit windows serve as an auxiliary emergency exit in the event rearward egress is not possible from the cockpit. This regulation therefore requires that any type of shading device residing within the cockpit window area must be easily removable so that the pilot and/or others are able exit the aircraft through the cockpit window.

Airworthiness also requires that the pilot be able to install and remove any modification while seated within the cockpit, and while also being able to continue to operate the aircraft. The may require one-handed or two handed removal, and installation and removal cannot require the use of any tools.

In short, the extensive regulations involved is designing any type of shade device to meet all applicable FAA regulations for multiple types of aircraft, obtain the proper STC's and PMA's to produce and sell such products have not yet been met by any approved product on the market. Accordingly, there is a need in the industry for a window shade solution which can be easily implemented without a permanent installation within the aircraft.

SUMMARY OF THE DISCLOSURE

According to exemplary embodiments of the invention, a unique cockpit window panel system may include unique tinted panels and panel bracket which are easily installed and removed allowing compliance with FAA regulations. The tinted panels, when installed, block 99.9% of UV radiation, reduce glare by up to 70%, reduce heat from solar energy up to 47% and thus improve overall cockpit environment and pilot comfort. The panels allow the pilot to selectively block the sun when needed to remove glare and to remove the discomfort of being exposed to direct sunlight coming from the side windows. The panels reduce pilot fatigue, reduce eye strain and increase pilot performance and comfort and most of all improve flying safety.

The window panels generally comprise a transparent, shatterproof, flexible polymer sheet which has an outer peripheral edge that may generally follow the same shape as the aircraft window, window frame or window surround. The panels may be provided for the cockpit windshield and the side windows. The transparent polymer sheet may be tinted when formed (during molding or extrusion) or may be provided with a tinted, anti-glare film applied to the sheet or by means of appropriate intermediate bonding film(s) or may be coated with tinting, anti-glare, anti-fog and UV-A and UV-B coatings as appropriate for the underlying polymer materials. The polymer sheet is flexible and may have a thickness in the range of 0.020" and 0.040" and in some exemplary embodiments may be 0.030".

The flexible polymer sheet is bounded by a flexible trim having a generally U-shaped channel which is frictionally received over the peripheral edge of the panel. In some embodiments, the trim extends around the entire perimeter of the sheet. In other embodiments, there may be gaps in the trim for various fit scenarios with mounting clips or brackets as described below. Additionally, the windshield panels may have the trim only on the sides and top so as not to interfere with the pilot's line of vision when installed in the upper half of the cockpit windshield area.

The window panels are installed into proprietary shaped mounting clips or brackets which are removably adhered to the inner surfaces of the window frame or window surround areas in strategic locations. The brackets are formed or molded from a UV resistant polymer material which will not degrade from prolonged UV exposure. Each aircraft has different window shapes and window frame surrounds and therefore a variety of different clips and brackets are provided for various installation locations. Each clip or bracket may have a groove or channel which receives the outer edge trim of the window panel. Finger notches may be provided at the bottom and/or top or sides of the window panel adjacent to the mounting clips for easy removal of the panel. In some embodiments, Velcro strips or double sided adhesive tapes may be used to removably secure the clips or brackets in place. Because the panels are flexible they can be easily flexed into a shape which follows the curvature of the aircraft window and allows insertion and removal of the peripheral edges into/from the mounting bracket grooves other attachments to aircraft surround structure.

The key aspect of the window panels is that they are easily installed by simply flexing and inserting/securing them into place around or within the windows surround area, and also that they are easily removable. In particular, the panels utilize only two (2) or three (3) mounting points which may allow one-handed installation and removal of the shades during flight. When the sun is causing too much glare on the instrument panel, or discomfort to the pilot, the panels can be quickly fit into place and secured, and likewise removed when needed.

A tinted removable window system may further include universal vertical sliding shade panels (cruising shades) that may be utilized during high altitude cruising intervals where the sun is shining nearly or directly horizontal into the cockpit below the installed windshield shade. These universal shade panels can be inserted behind the windshield panels in a vertical orientation and captured between the installed windshield panel and the windshield and held in place at the bottom by the lower windshield frame. In this regard, the vertical cruising panels can be slidably movable left to right within the windshield to selectively be aligned with the sun position relative to the cockpit.

Exemplary embodiments of the tinted window panels and the various clips, brackets and attachments are illustrated and more clearly described in with respect to winged aircraft including prop and jet aircraft as well as helicopters.

The exemplary window panels provide a 36% reduction in solar energy in the cockpit, block 80% of light transmission, block 99% of UV transmission and reduce glare by 79%. Further testing reveals that use of the windows panels reduces the interior temperature of the cockpit by 10-25 degrees F. as compared without the windows panels.

BRIEF DESCRIPTION OF THE DRAWING FIGURES

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIG. 1 is an illustration of an exemplary aircraft window arrangement including pilot and co-pilot front and side windows;

FIG. 2 is an illustration of an exemplary pilot side window panel;

FIG. 3 is an illustration of an exemplary co-pilot side window panel;

FIG. 4 is an illustration of an exemplary pilot/co-pilot windshield panel;

FIG. 5 is an illustration of an exemplary cruising panel;

FIG. 6 is an illustration of an exemplary pilot side window panel with its associated mounting brackets;

DETAILED DESCRIPTION OF THE EXEMPLARY EMBODIMENTS

Figure 7:
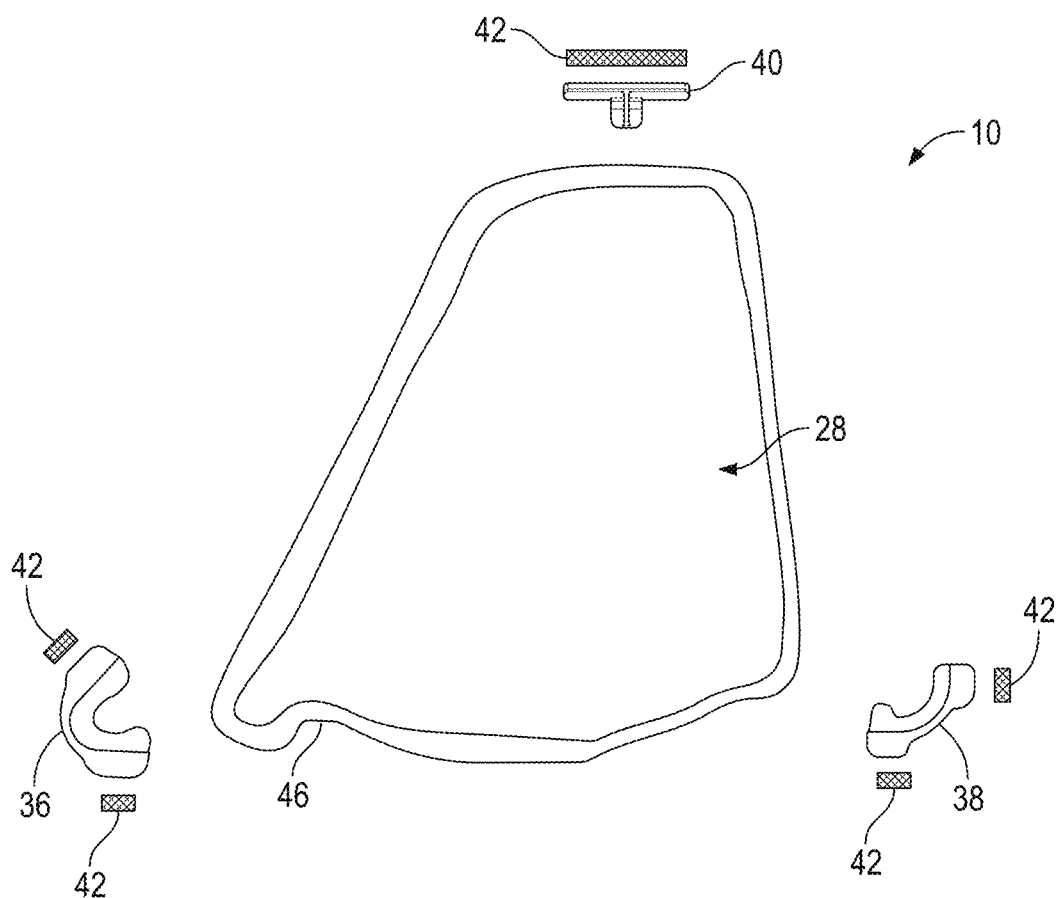
FIG. 7 is an illustration of an exemplary co-pilot side window panel with its associated mounting brackets.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to FIGS. 1-14, and according to exemplary embodiments of the invention, a unique cockpit window panel system 10 may include one or more uniquely contoured and shaped tinted window panels and a plurality of window panel mounting brackets which are easily installed and removed allowing compliance with FAA regulations. The tinted panels, when installed, reduce glare and heat and improves overall cockpit environment and pilot comfort. The panels allow the pilot to selectively block the sun when needed to remove glare and to remove the discomfort of being exposed to direct sunlight coming from the side windows. The panels reduce pilot fatigue, reduce eye strain and increase pilot performance and comfort and most of all improve flying safety.

Exemplary embodiments of the tinted window panels and the various clips, brackets and securing media are illustrated and more clearly described in with respect to a winged aircraft. However it should be clearly understood that the concepts disclosed herein are applicable to aircraft of all types, including but not limited to propeller aircraft, jet aircraft and helicopters.

Referring to FIG. 1, there is illustrated an exemplary aircraft window arrangement including pilot and co-pilot windshields 12a, 12b, pilot side window 14 and co-pilot side window 16 and further including the respective windshield surround structure 18, and the side window surround structures 20, 22. In some embodiments, this surround structure may be a framed solid surface window surround (as illustrated) (decorative and/or structural), and in some embodiments, such as sliding canopy cockpits in smaller aircraft, and in certain helicopter cockpits, the surround structure may be a tubular structural frame member or other structural members.

Referring to FIGS. 2-5, the system may generally comprise a windshield panel 24, a pilot side window panel 26, a co-pilot side window panel 28 and a vertically oriented cruising panel 30. In the present disclosure, only one windshield panel 24 and one cruising panel 30 are illustrated for the sake of simplifying the descriptions, but it should be understood that a tinted window panel in accordance with the teachings of the present invention may be provided for each window within the aircraft, including sky lights and other rearward windows that may create glare within the cockpit area.

The various window panels 24, 26, 28, 30 may each comprise a shatterproof, transparent or flexible, polymer sheet 32 which has an outer peripheral edge that may generally follow the same shape as the aircraft window, window frame or window surround in which it is to be mounted. The transparent polymer sheet 32 may be tinted when formed (during molding or extrusion) or may be provided with a tinted, anti-glare film applied to the sheet or by means of appropriate intermediate bonding film(s) or may be coated with tinting, anti-glare, anti-fog and UV-A and UV-B coatings as appropriate for the underlying polymer materials. The polymer sheet is flexible and may have a thickness in the range of 0.020" and 0.040" and in some exemplary embodiments may be 0.030". In some embodiments, the sheet may comprise polyethylene which is encapsulated with the various coatings as set forth above.

The polymer sheet 32 is bounded by a flexible trim 34 having a generally U-shaped channel which is received over the peripheral edge of the sheet 32. In some embodiments, the trim 34 extends around the entire perimeter of the sheet 32 (see side window panels 26 and 28 in FIGS. 2, 3, 6, 7). In other embodiments, there may be gaps in the trim 34 for various fit scenarios with mounting clips or brackets as described below (see windshield panel 24 and cruising panel 30 in FIGS. 4, 5, 13, 14). The windshield panel(s) 24 may have the trim only on the sides and top so as not to interfere with the pilot's line of vision when installed in the upper half of the cockpit windshield area (See FIGS. 13 and 14).

Referring to FIGS. 6-13, it can be seen that the window panels 24, 26 and 28 are removably mounted into their respective window surround structures with uniquely shaped mounting brackets which are removably adhered to the inner surfaces of the window frame or window surround areas in strategic locations. The various mounting brackets may be formed or molded from a UV resistant polymer material, such as for example, Acrylonitrile Styrene Acrylate (ASA) which will not degrade from prolonged UV exposure.

Referring to FIGS. 6, 7, 9, 10 and 11, the pilot side window panel 26 and co-pilot side window panel 28 are secured with front and rear mounting brackets 36, 38 and a top mounting bracket 40. Each mounting bracket 36, 38, 40 has a rearward facing mounting surface 36a, 38a, 40a contoured to match a predetermined portion of the aircraft window surround structure.

Each bracket 36, 38, 40 also includes one or more strips of two-sided removable securing media 42 received between the respective mounting surface 36a, 38a, 40a of the mounting bracket and the aircraft window surround structure 18, 20, 22 for removably securing the mounting bracket 36, 38, 40 to the aircraft window surround structure. In some embodiments, the securing media may comprise two-sided hook and loop fastening material (such as Velcro™) or other two-sided adhesive materials which may be appropriate for the mounting configuration.

Still referring to FIGS. 6 and 7, each of mounting brackets 36 and 38 have a mounting groove 36b, 38b configured and arranged to accept a predetermined peripheral edge portion of the window panel 26, 28. Top bracket 40 may include a downwardly extending tab 40b.

During installation, the panels 26, 28 may be flexed into position such that predetermined peripheral edge portions of the window panels 26, 28 are selectively and removably received into the mounting grooves 36b, 38b in each of the mounting brackets and behind the tab 40b to removably support the window panels 26, 28 in place during use.

Figure 8:
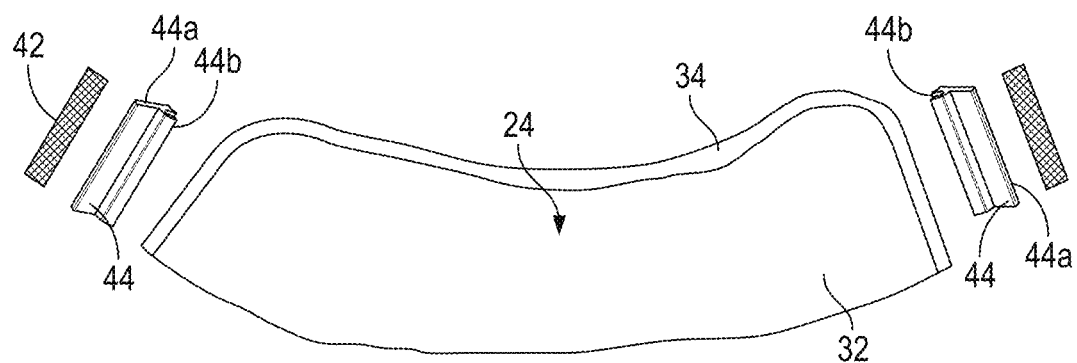
FIG. 8 is an illustration of an exemplary pilot/co-pilot windshield panel with its associated mounting brackets.
Figure 9:
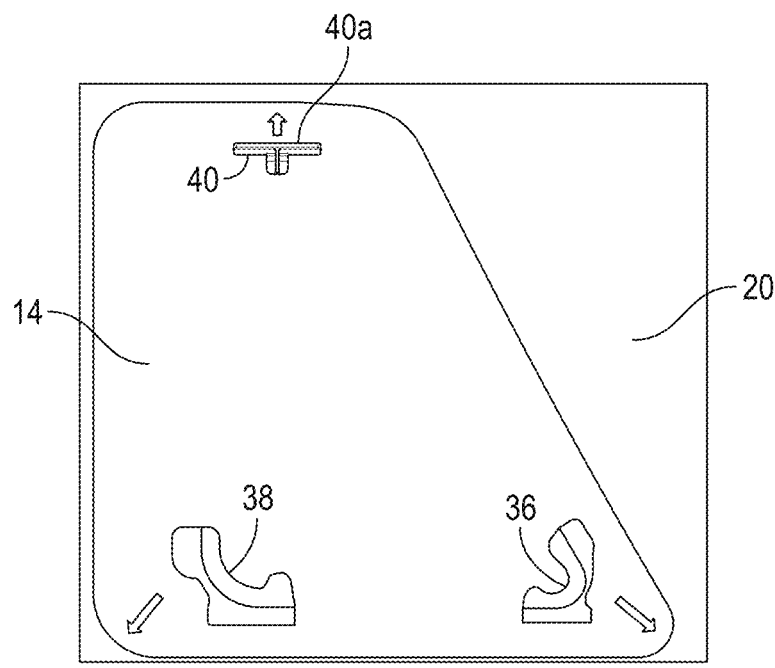
FIG. 9 is an exemplary illustration showing installation of the pilot side window panel mounting brackets into the pilot side window surrounding frame.
Figure 10:
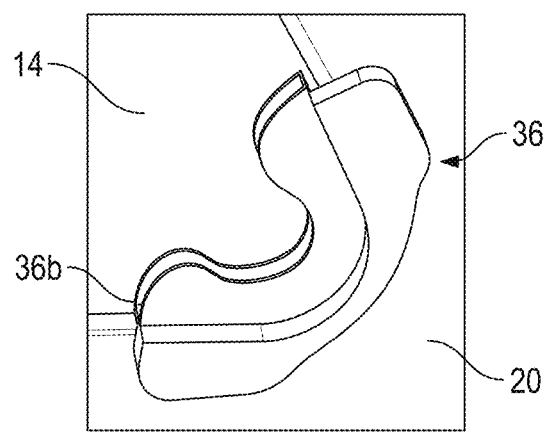
FIG. 10 is an enlarged view of the front mounting bracket of the pilot side window panel installed onto the side window frame.
Figure 12:
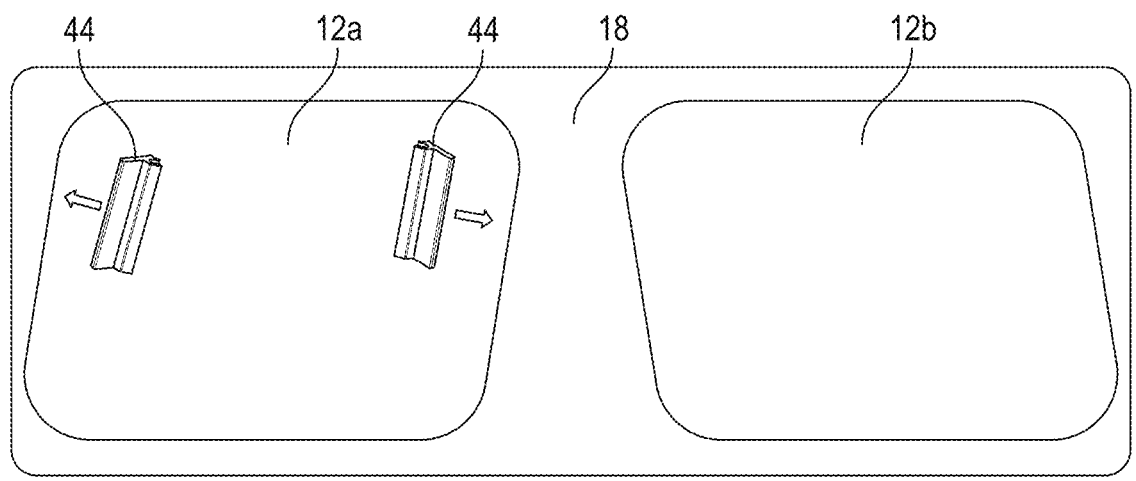
FIG. 12 is an enlarged view of the opposing mounting brackets of the pilot windshield panel installed onto the pilot side windshield frame.
Figure 13:
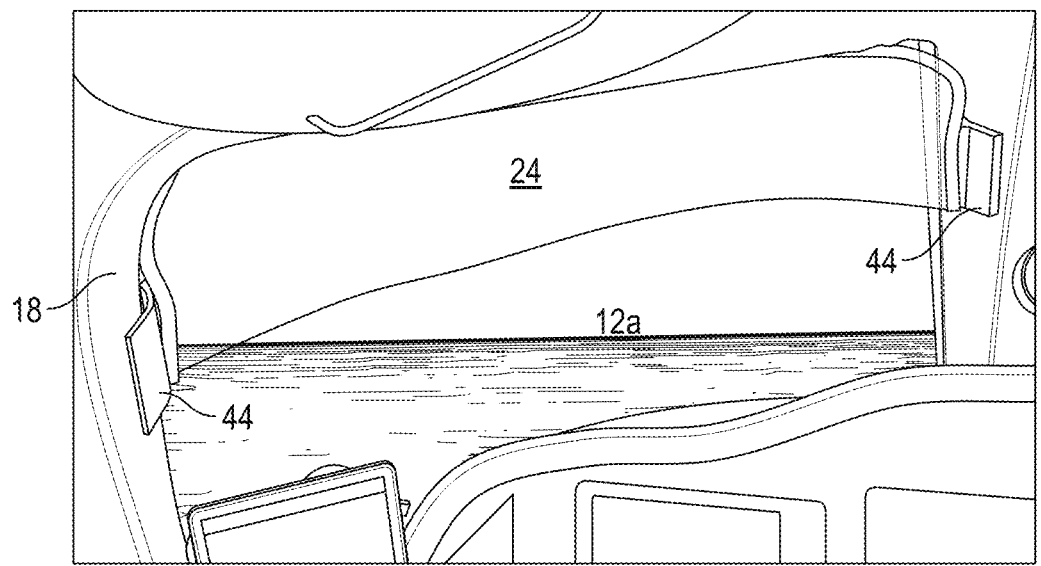
FIG. 13 is an illustration of the pilot windshield panel installed in place into the grooves on the mounting brackets.

Referring to FIGS. 8, 12 and 13, the windshield panel 24 is secured with left and right mounting brackets 44. Each mounting bracket 44 has a rearward facing mounting surface 44a, contoured to match a predetermined portion of the aircraft side window surround structure 20, 22.

Each bracket 44 also includes one or more strips of two-sided removable securing media 42 received between the respective mounting surface 44a of the mounting bracket 44 and the aircraft windshield surround structure 18 for removably securing the mounting bracket 44 to the aircraft windshield surround structure. In some embodiments, the securing media may comprise two-sided hook and loop fastening material (such as Velcro™) or other two-sided adhesive materials which may be appropriate for the mounting configuration.

Again referring to FIGS. 8, 12 and 13, each of mounting brackets 44 has a mounting groove 44b configured and arranged to accept a predetermined peripheral edge portion of the window panel 24.

During installation, the panel 24 may be flexed into position such that predetermined peripheral side edge portions of the window panel(s) 24 are selectively and removably received into the mounting grooves 44b in each of the mounting brackets 44 to removably support the window panel 24 in place during use. As noted above, only a single windshield panel 24 is illustrated and described here for simplicity, but the system may include panels 24 for both the pilot and co-pilot windshields 12a, 12b.

Figure 11:
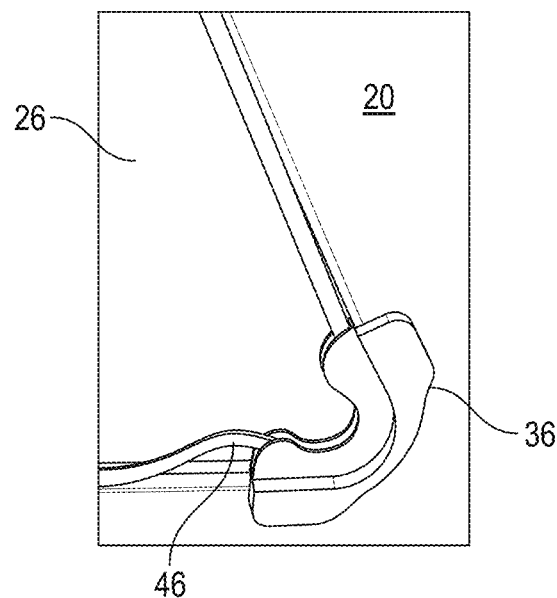
FIG. 11 is an enlarged view showing the pilot side window panel installed in place into the groove on the mounting brackets.

Each aircraft has different window shapes and window frame surrounds and therefore a variety of different clips and brackets may be provided for various installation locations. Referring to FIGS. 6, 7 and 11, finger notches 46 may be provided at the bottom and/or top or sides of any window panel 24, 26, 28 adjacent to a respective mounting bracket 36, 38, 40 for facilitating the removal of the panel. Because the panels are flexible they can be easily flexed into a shape which allows insertion and removal of the peripheral edges into/from the mounting brackets.

A key aspect of the window panels is that they are easily installed by simply flexing and inserting/securing them into place around or within the windows surround area, and also that they are easily removable. In particular, the window panel system utilize only two (2) or three (3) mounting points which may allow one-handed installation and removal of the shades into and from their mounting brackets during flight. When the sun is causing too much glare on the instrument panel, or discomfort to the pilot, the panels can be quickly fit into place and secured, and likewise removed when needed. When the sun is causing too much glare on the instrument panel, or discomfort to the pilot, the panels can be quickly fit into place and secured.

Figure 14:
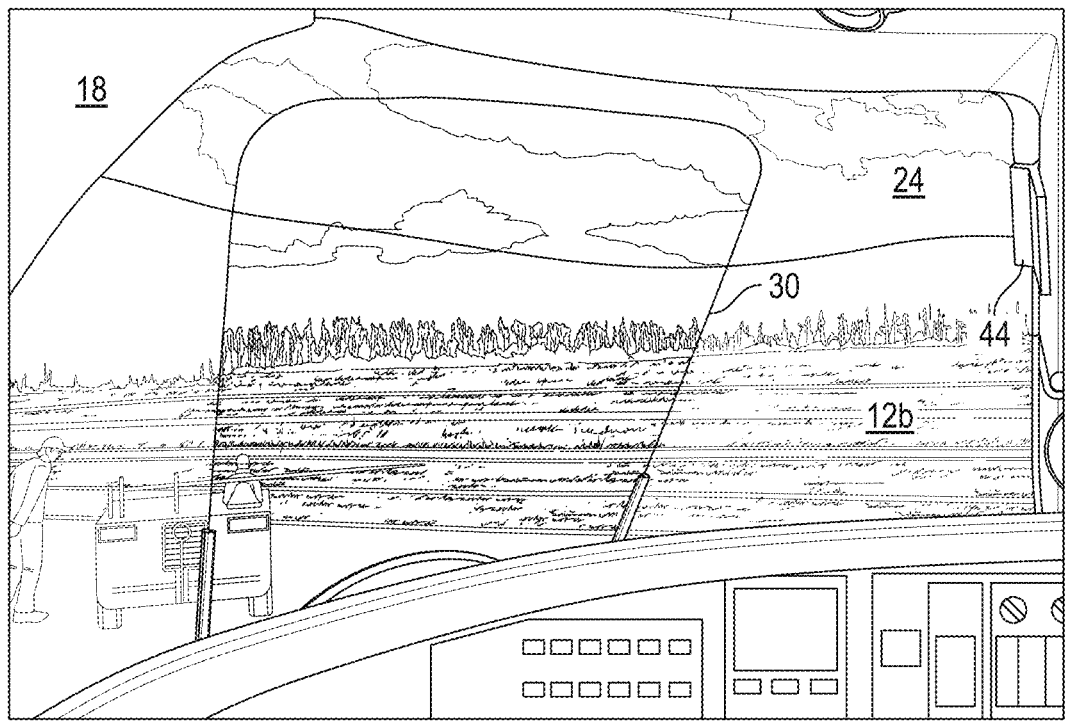
FIG. 14 is an illustration of a cruising panel installed in place between the windshield panel and the aircraft windshield.
Figure 15:
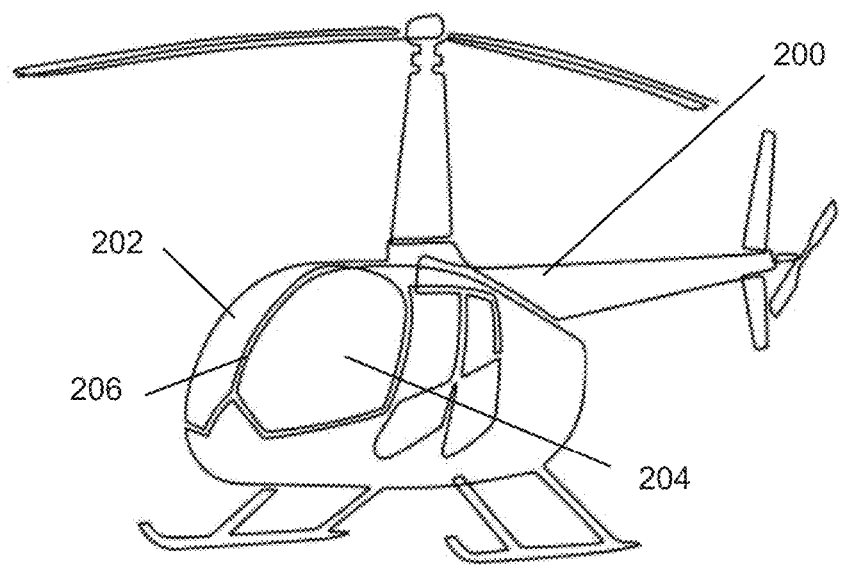
FIG. 15 is an illustration of an exemplary helicopter aircraft.
Figure 16:
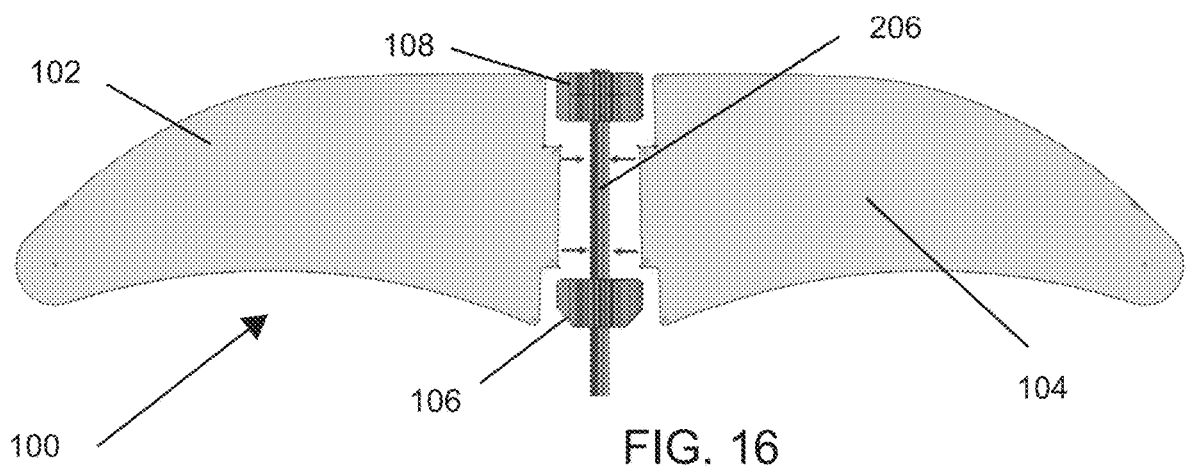
FIG. 16 is an illustration of an exemplary removable window panel system adapted for a helicopter of the type illustrated in FIG. 15.
Figures 17, 18:
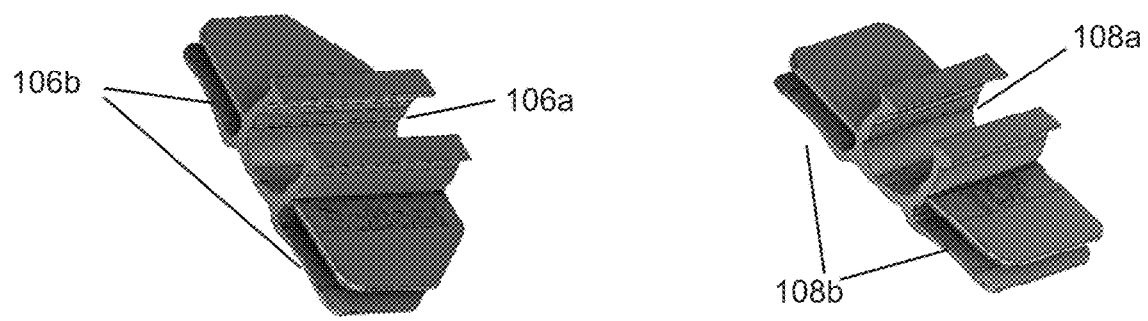
FIG. 17 is a perspective view of a bottom two-sided mounting bracket.
FIG. 18 is a perspective view of top two-sided mounting bracket.

Turning to FIGS. 5, 13 and 14, the window system may further include one or more universal vertical sliding shade panels (cruising shades) 30 that may be utilized during high altitude cruising intervals where the sun is shining nearly or directly horizontal into the cockpit below the installed windshield panel 24.

Referring to FIGS. 13 and 14, these universal shade panels 30 do not require mounting brackets and can be inserted behind the windshield panels 24 in a vertical orientation and captured between the installed windshield panel 24 and the windshield 12a and held in place at the bottom by the lower windshield frame surround 18. In this regard, the vertical cruising panels 30 can be slidably movable left to right within the windshield surround 18 to selectively be aligned with the sun position relative to the cockpit.

Another exemplary embodiment of a window panel system 100 is illustrated in FIGS. 15-18 with respect to a helicopter aircraft 200. The helicopter 200 includes two large main cockpit windows 202, 204 which are bounded by the helicopter body on the bottom, sides and top and separated in the center by a central structural tube or strut 206.

The window panel system 100 generally comprises a pilot windshield panel 102, a co-pilot windshield panel 104 and bottom and top double-sided mounting brackets 106, 108.

The windshield panels 102, 104 are generally triangular-shaped and contoured to match the unique curvature of the helicopter windshields 202, 204. The windshield panels 102, 104 are the same as previously hereinabove with the same UV, and tinting coatings for occupant protection and comfort and flexible polymer trim edges.

Each mounting bracket 106, 108 has a central rearward facing mounting channel 106a, 108a contoured to match the shape of the central column 206. Each of mounting brackets 106 and 108 have opposed mounting grooves 106b, 108b configured and arranged to accept the peripheral edge portions of the window panels 102, 104.

Each bracket 106, 106 may also includes a strip of two-sided removable securing media (not shown) received within the mounting channel to secure the bracket to the central column 206 and prevent movement from vibration. In some embodiments, the securing media may comprise two-sided hook and loop fastening material (such as Velcro™) or other two-sided adhesive materials which may be appropriate for the mounting configuration.

During installation, the panels 102, 104 may be flexed into position such that upper peripheral edge portions of the window panels are selectively and removably received into the mounting grooves 106b, 108b in each of the mounting brackets while the remaining peripheral edges may be tucked behind structural frame bolts in the window track or otherwise removably secured with hook and loop fastening material to the helicopter frame.

Since each aircraft has a unique interior window surround structure, the shapes of the window panels and the configuration of the mounting brackets may be customized for each aircraft and mounting scenario. However, the general structural arrangement of the window panel and the mounting brackets is nevertheless the same. Each window panel system may include two (2) or three (3) strategically shaped and located mounting brackets to facilitate installation and removal while the pilot is seated within the confined cockpit area. Each mounting bracket will include a rearwardly facing mounting surface configured to mount to a respective window surround structure within the cockpit. In some embodiments, this may be a framed solid surface window surround, and in some embodiments, such as sliding canopy cockpits in smaller aircraft, and in some helicopter cockpits, this may be a tubular frame member or other structural frame member. Every mounting bracket configuration includes this aircraft facing mounting surface, a two-sided securing media and a mounting groove or tab to receive or retain the peripheral edge of the window panel.

The exemplary removable window panels provide up to a 47% reduction in solar energy in the cockpit, block 80% of light transmission, block 99% of UV transmission and reduce glare by more than 70%. Further testing reveals that use of the windows panels reduces the interior temperature of the cockpit by 10-25° F. as compared without the tinted windows panels.

Additional exemplary embodiments may include window panel kits which provide for full cockpit coverage with pilot and co-pilot windshield panels as well as side window panels, all needed mounting brackets, window panel cleaning cloth, storage sleeves, and installation accessories to fully protect the entire cockpit area.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A window panel system for an aircraft cockpit having a cockpit window and cockpit window surround structure bordering the cockpit window, the window panel system comprising:
    a flexible, tinted window panel having an outer peripheral edge which is contoured to match the aircraft window surround structure and further having a flexible panel trim, wherein the window panel is at least partially bounded by the flexible panel trim, the flexible panel trim having a generally U-shaped channel which is received over the peripheral edge of the window panel;
    a plurality of mounting brackets for removably mounting the window panel within the aircraft window surround,
    each of said mounting brackets having a mounting surface contoured to match a predetermined portion of the aircraft window surround structure,
    a removable securing media received between the mounting surface of the mounting bracket and the aircraft window surround structure for removably securing the mounting bracket to the aircraft window surround structure;
    each of said mounting brackets having a mounting groove configured and arranged to accept a predetermined peripheral edge portion of the window panel,
    wherein the predetermined peripheral edge portions of the window panel are selectively and removably received into the mounting grooves in each of said mounting brackets to removably support the window panel in place during use,
    wherein the window panel is a windshield panel and the flexible trim bounds only the sides and top of the window panel so as not to interfere with the pilot's line of vision when installed in the upper half of the cockpit windshield surround.

2. A window panel system for an aircraft cockpit having a cockpit window and cockpit window surround structure bordering the cockpit window, the window panel system comprising:
    a flexible, tinted window panel having an outer peripheral edge which is contoured to match the aircraft window surround structure and further having a flexible panel trim, wherein the window panel is at least partially bounded by the flexible panel trim, the flexible panel trim having a generally U-shaped channel which is received over the peripheral edge of the window panel;
    a plurality of mounting brackets for removably mounting the window panel within the aircraft window surround,
    each of said mounting brackets having a mounting surface contoured to match a predetermined portion of the aircraft window surround structure,
    a removable securing media received between the mounting surface of the mounting bracket and the aircraft window surround structure for removably securing the mounting bracket to the aircraft window surround structure;
    each of said mounting brackets having a mounting groove configured and arranged to accept a predetermined peripheral edge portion of the window panel,
    wherein the predetermined peripheral edge portions of the window panel are selectively and removably received into the mounting grooves in each of said mounting brackets to removably support the window panel in place during use,
    wherein the window panel is a windshield panel which is contoured to extend over an upper half of the cockpit window, and
    the window panel system further comprising a generally rectangular flexible, tinted cruising window panel having a flexible panel trim, wherein the cruising window panel is at least partially bounded by the flexible panel trim around bottom and side peripheral edges thereof, the flexible panel trim having a generally U-shaped channel which is received over the peripheral edge of the cruising window panel,
    wherein the cruising window panel is received between the windshield panel and the cockpit window and captured at the bottom within the windshield surround structure.

3. A window panel system for an aircraft cockpit having a cockpit windshield and a cockpit side window and window surround structures bordering the cockpit windshield and cockpit side window, the window panel system comprising:
    a flexible, tinted side window panel having an outer peripheral edge which is contoured to match the aircraft side window surround structure and further having a flexible panel trim, wherein the side window panel is at least partially bounded by the flexible panel trim, the flexible panel trim having a generally U-shaped channel which is received over the peripheral edge of the side window panel;
    a plurality of side window mounting brackets for removably mounting the side window panel within the aircraft side window surround, each of said side mounting brackets having a mounting surface contoured to match a predetermined portion of the aircraft side window surround structure,
    a removable securing media received between the mounting surface of the side window mounting bracket and the aircraft side window surround structure for removably securing the side window mounting bracket to the aircraft side window surround structure;
    each of said side window mounting brackets having a mounting groove configured and arranged to accept a predetermined peripheral edge portion of the side window panel,
    wherein the predetermined peripheral edge portions of the side window panel are selectively and removably received into the mounting grooves in each of said side window mounting brackets to removably support the side window panel in place during use;
    a flexible, tinted windshield panel having an outer peripheral edge which is contoured to match the aircraft windshield surround structure and further having a flexible panel trim, wherein the windshield panel is at least partially bounded by the flexible panel trim, the flexible panel trim having a generally U-shaped channel which is received over the peripheral edge of the windshield panel;
    a plurality of windshield panel mounting brackets for removably mounting the windshield panel within the aircraft windshield surround structure, each of said windshield panel mounting brackets having a mounting surface contoured to match a predetermined portion of the aircraft windshield surround structure, a removable securing media received between the mounting surface of the windshield panel mounting bracket and the aircraft windshield surround structure for removably securing the windshield panel mounting bracket to the aircraft windshield surround structure;

each of said windshield panel mounting brackets having a mounting groove configured and arranged to accept a predetermined peripheral edge portion of the windshield panel, wherein the predetermined peripheral edge portions of the windshield panel are selectively and removably received into the mounting grooves in each of said windshield panel mounting brackets to removably support the windshield panel in place during use, wherein the windshield panel and the flexible trim bounds only the sides and top of the window panel so as not to interfere with the pilot's line of vision when installed in the upper half of the cockpit windshield surround.

4. A window panel system for an aircraft cockpit having a cockpit windshield and a cockpit side window and window surround structures bordering the cockpit windshield and cockpit side window, the window panel system comprising:

a flexible, tinted side window panel having an outer peripheral edge which is contoured to match the aircraft side window surround structure and further having a flexible panel trim, wherein the side window panel is at least partially bounded by the flexible panel trim, the flexible panel trim having a generally U-shaped channel which is received over the peripheral edge of the side window panel;

a plurality of side window mounting brackets for removably mounting the side window panel within the aircraft side window surround, each of said side mounting brackets having a mounting surface contoured to match a predetermined portion of the aircraft side window surround structure, a removable securing media received between the mounting surface of the side window mounting bracket and the aircraft side window surround structure for removably securing the side window mounting bracket to the aircraft side window surround structure;

each of said side window mounting brackets having a mounting groove configured and arranged to accept a predetermined peripheral edge portion of the side window panel, wherein the predetermined peripheral edge portions of the side window panel are selectively and removably received into the mounting grooves in each of said side window mounting brackets to removably support the side window panel in place during use;

a flexible, tinted windshield panel having an outer peripheral edge which is contoured to match the aircraft windshield surround structure and further having a flexible panel trim, wherein the windshield panel is at least partially bounded by the flexible panel trim, the flexible panel trim having a generally U-shaped channel which is received over the peripheral edge of the windshield panel;

a plurality of windshield panel mounting brackets for removably mounting the windshield panel within the aircraft windshield surround structure, each of said windshield panel mounting brackets having a mounting surface contoured to match a predetermined portion of the aircraft windshield surround structure, a removable securing media received between the mounting surface of the windshield panel mounting bracket and the aircraft windshield surround structure for removably securing the windshield panel mounting bracket to the aircraft windshield surround structure;

each of said windshield panel mounting brackets having a mounting groove configured and arranged to accept a predetermined peripheral edge portion of the windshield panel, wherein the predetermined peripheral edge portions of the windshield panel are selectively and removably received into the mounting grooves in each of said windshield panel mounting brackets to removably support the windshield panel in place during use, and the window panel system further comprising a generally rectangular flexible, tinted cruising window panel having a flexible panel trim, wherein the cruising window panel is at least partially bounded by the flexible panel trim around bottom and side peripheral edges thereof, the flexible panel trim having a generally U-shaped channel which is received over the peripheral edge of the cruising window panel, wherein the cruising window panel is received between the windshield panel and the cockpit window and captured at the bottom within the windshield surround structure.

5. A window panel system for an aircraft cockpit having a cockpit windshield and a cockpit side window and window surround structures bordering the cockpit windshield and cockpit side window, the window panel system comprising:

a flexible, tinted side window panel having an outer peripheral edge which is contoured to match the aircraft side window surround structure and further having a flexible panel trim, wherein the side window panel is at least partially bounded by the flexible panel trim, the flexible panel trim having a generally U-shaped channel which is received over the peripheral edge of the side window panel;

a plurality of side window mounting brackets for removably mounting the side window panel within the aircraft side window surround, each of said side mounting brackets having a mounting surface contoured to match a predetermined portion of the aircraft side window surround structure, a removable securing media received between the mounting surface of the side window mounting bracket and the aircraft side window surround structure for removably securing the side window mounting bracket to the aircraft side window surround structure;

each of said side window mounting brackets having a mounting groove configured and arranged to accept a predetermined peripheral edge portion of the side window panel, wherein the predetermined peripheral edge portions of the side window panel are selectively and removably received into the mounting grooves in each of said side window mounting brackets to removably support the side window panel in place during use;

a flexible, tinted windshield panel having an outer peripheral edge which is contoured to match the aircraft windshield surround structure and further having a flexible panel trim, wherein the windshield panel is at least partially bounded by the flexible panel trim, the flexible panel trim having a generally U-shaped channel which is received over the peripheral edge of the windshield panel;

a plurality of windshield panel mounting brackets for removably mounting the windshield panel within the aircraft windshield surround structure, each of said windshield panel mounting brackets having a mounting surface contoured to match a predetermined portion of the aircraft windshield surround structure, a removable securing media received between the mounting surface of the windshield panel mounting bracket and the aircraft windshield surround structure for removably securing the windshield panel mounting bracket to the aircraft windshield surround structure;

each of said windshield panel mounting brackets having a mounting groove configured and arranged to accept a predetermined peripheral edge portion of the windshield panel, wherein the predetermined peripheral edge portions of the windshield panel are selectively and removably received into the mounting grooves in each of said windshield panel mounting brackets to removably support the windshield panel in place during use, wherein the flexible trim extends around the entire perimeter of the window panel, and the window panel system further comprising a generally rectangular flexible, tinted cruising window panel having a flexible panel trim, wherein the cruising window panel is at least partially bounded by the flexible panel trim around bottom and side peripheral edges thereof, the flexible panel trim having a generally U-shaped channel which is received over the peripheral edge of the cruising window panel, wherein the cruising window panel is received between the windshield panel and the cockpit window and captured at the bottom within the windshield surround structure.

6. A window panel system for an aircraft cockpit having a cockpit windshield and a cockpit side window and window surround structures bordering the cockpit windshield and cockpit side window, the window panel system comprising:

a flexible, tinted side window panel having an outer peripheral edge which is contoured to match the aircraft side window surround structure and further having a flexible panel trim, wherein the side window panel is at least partially bounded by the flexible panel trim, the flexible panel trim having a generally U-shaped channel which is received over the peripheral edge of the side window panel;

a plurality of side window mounting brackets for removably mounting the side window panel within the aircraft side window surround, each of said side mounting brackets having a mounting surface contoured to match a predetermined portion of the aircraft side window surround structure, a removable securing media received between the mounting surface of the side window mounting bracket and the aircraft side window surround structure for removably securing the side window mounting bracket to the aircraft side window surround structure;

each of said side window mounting brackets having a mounting groove configured and arranged to accept a predetermined peripheral edge portion of the side window panel, wherein the predetermined peripheral edge portions of the side window panel are selectively and removably received into the mounting grooves in each of said side window mounting brackets to removably support the side window panel in place during use;

a flexible, tinted windshield panel having an outer peripheral edge which is contoured to match the aircraft windshield surround structure and further having a flexible panel trim, wherein the windshield panel is at least partially bounded by the flexible panel trim, the flexible panel trim having a generally U-shaped channel which is received over the peripheral edge of the windshield panel;

a plurality of windshield panel mounting brackets for removably mounting the windshield panel within the aircraft windshield surround structure, each of said windshield panel mounting brackets having a mounting surface contoured to match a predetermined portion of the aircraft windshield surround structure, a removable securing media received between the mounting surface of the windshield panel mounting bracket and the aircraft windshield surround structure for removably securing the windshield panel mounting bracket to the aircraft windshield surround structure;

each of said windshield panel mounting brackets having a mounting groove configured and arranged to accept a predetermined peripheral edge portion of the windshield panel, wherein the predetermined peripheral edge portions of the windshield panel are selectively and removably received into the mounting grooves in each of said windshield panel mounting brackets to removably support the windshield panel in place during use, wherein the flexible trim extends around the entire perimeter of the window panel, and the window panel system further comprising a generally rectangular flexible, tinted cruising window panel having a flexible panel trim, wherein the cruising window panel is at least partially bounded by the flexible panel trim around bottom and side peripheral edges thereof, the flexible panel trim having a generally U-shaped channel which is received over the peripheral edge of the cruising window panel, wherein the cruising window panel is received between the windshield panel and the cockpit window and captured at the bottom within the windshield surround structure.

7. The window panel system of claim 3 further comprising a generally rectangular flexible, tinted cruising window panel having a flexible panel trim, wherein the cruising window panel is at least partially bounded by the flexible panel trim around bottom and side peripheral edges thereof, the flexible panel trim having a generally U-shaped channel which is received over the peripheral edge of the cruising window panel, wherein the cruising window panel is received between the windshield panel and the cockpit window and captured at the bottom within the windshield surround structure.

* * * * *